April 24, 1962     C. H. KEITH     3,031,123

CARTON

Filed March 1, 1960     10 Sheets-Sheet 1

INVENTOR.
CLIFFORD H. KEITH
BY GLEIM & CANDOR

ATTORNEYS

April 24, 1962 C. H. KEITH 3,031,123
CARTON
Filed March 1, 1960 10 Sheets-Sheet 4
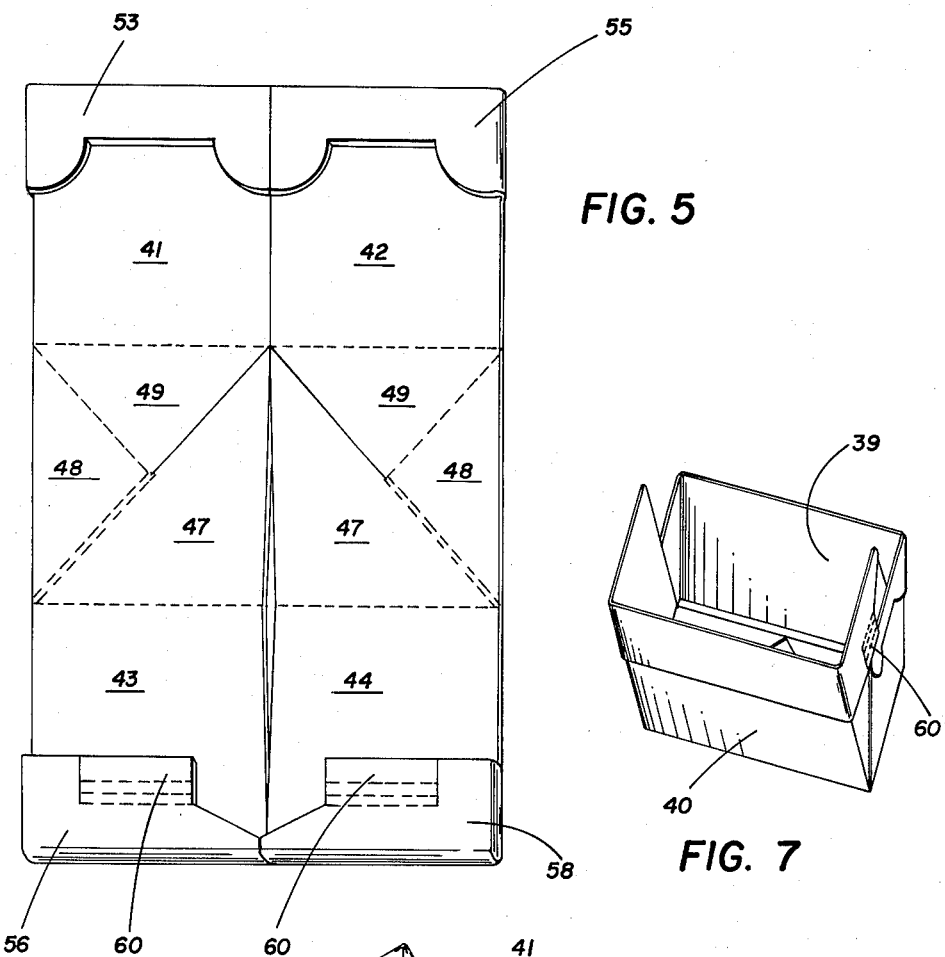
FIG. 5
FIG. 7
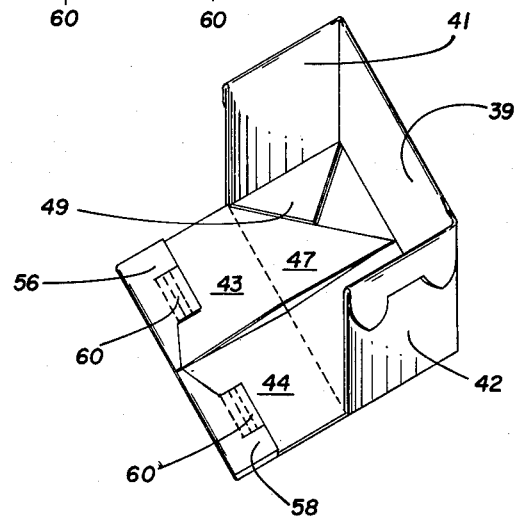
FIG. 6
INVENTOR.
CLIFFORD H. KEITH
BY GLEIM & CANDOR
ATTORNEYS April 24, 1962 C. H. KEITH 3,031,123
CARTON
Filed March 1, 1960 10 Sheets-Sheet 5

INVENTOR.
CLIFFORD H. KEITH
BY GLEIM & CANDOR
ATTORNEYS

April 24, 1962 C. H. KEITH 3,031,123
CARTON
Filed March 1, 1960 10 Sheets-Sheet 6
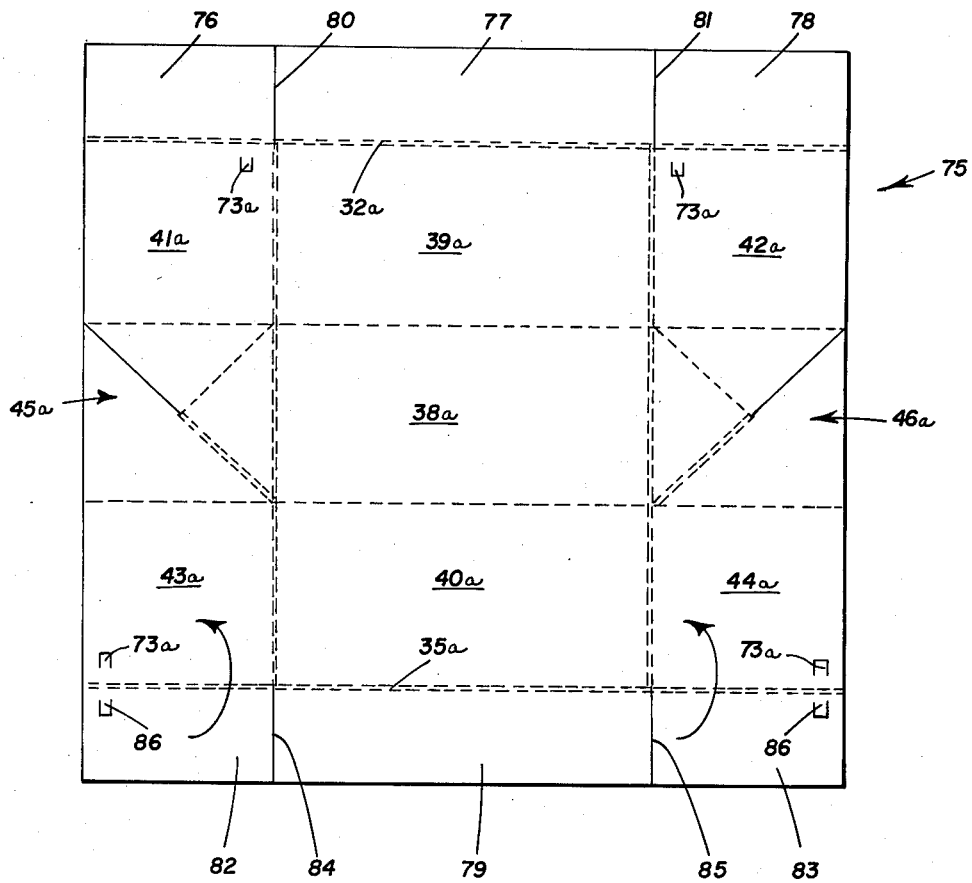
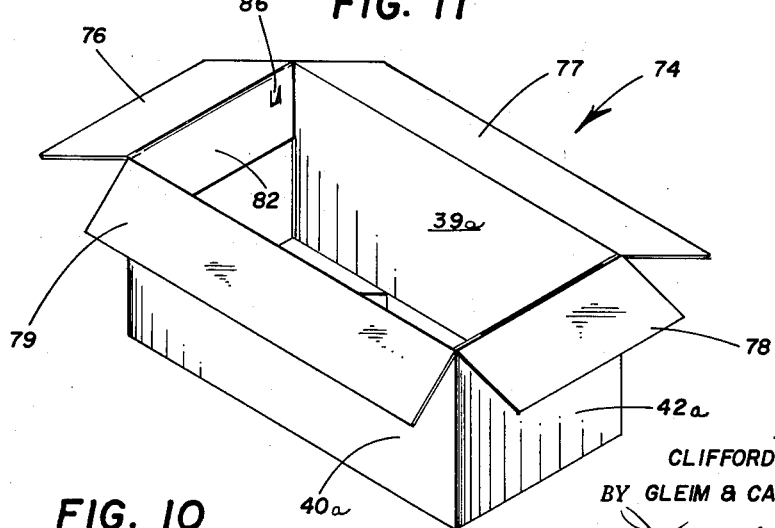
FIG. 11
FIG. 10
INVENTOR.
CLIFFORD H. KEITH
BY GLEIM & CANDOR
ATTORNEYS April 24, 1962    C. H. KEITH    3,031,123
CARTON Filed March 1, 1960    10 Sheets-Sheet 7

INVENTOR.
CLIFFORD H. KEITH
BY GLEIM & CANDOR
ATTORNEYS

April 24, 1962 C. H. KEITH 3,031,123
CARTON
Filed March 1, 1960 10 Sheets-Sheet 8

INVENTOR.
CLIFFORD H. KEITH
BY GLEIM & CANDOR
ATTORNEYS

April 24, 1962  C. H. KEITH  3,031,123
CARTON

Filed March 1, 1960  10 Sheets-Sheet 9

INVENTOR.
CLIFFORD H. KEITH
BY GLEIM & CANDOR

ATTORNEYS

United States Patent Office 3,031,123
Patented Apr. 24, 1962

3,031,123
CARTON
Clifford H. Keith, Cincinnati, Ohio, assignor to The Mead Corporation, Dayton, Ohio, a corporation of Ohio
Filed Mar. 1, 1960, Ser. No. 12,063
6 Claims. (Cl. 229—16)

This invention relates to a carton which can be shipped or stored in a pre-assembled, flat, collapsed condition, when empty, and can be quickly and readily erected with a minimum of time and effort.

Heretofore, cartons have not been manufactured and assembled in a collapsed or flattened condition by the manufacturer for shipment or storage which could be easily erected to an article receiving position by unskilled labor in any desired location without the use of special tools or machinery by the ultimate user of the carton.

Moreover, collapsible cartons now available lack required structural strength, such strength having been sacrificed in an effort to attain proper collapsing.

Accordingly, it is an object of this invention to provide an improved collapsible carton which has unexpected structural strength in its article receiving position.

It is another object of this invention to provide such a carton which can be shipped or stored in preassembled flat condition and be readily and quickly erected to an article receiving position when desired.

It is also an object of this invention to provide an improved carton blank for making such a collapsible carton.

Other objects, uses and advantages of this invention will become apparent upon a reading of the following specification, taken in conjunction with the accompanying drawings forming a part thereof and wherein:

FIGURE 5 is a view similar to FIGURE 4 and illustrates the carton blank of FIGURE 3 in its final folded position, FIGURE 5 also illustrating the carton of FIGURE 1 in its collapsed condition;

FIGURE 6 is a perspective view illustrating one of the initial steps of erecting the carton of FIGURE 1 from its collapsed condition illustrated in FIGURE 5;

FIGURE 7 is a view similar to FIGURE 6 and illustrates another step in the method of assembling the carton to its erect position;

FIGURE 10 is a perspective view of another carton of this invention;

FIGURE 11 is a plan view for the carton of FIGURE 10;

Figure 1:
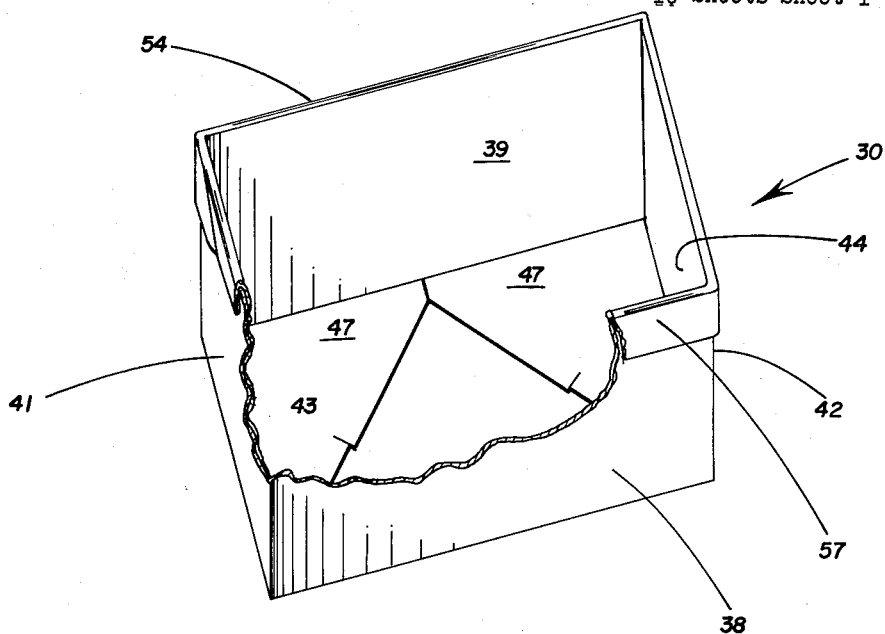
FIGURE 1 is a perspective view of a collapsible carton of this invention illustrated in its article receiving position, part of the carton being broken away.

Referring to the accompanying drawings, FIGURE 1 illustrates one embodiment of the carton of the invention which is generally indicated by reference numeral 30. This carton is readily and quickly collapsed into a flattened condition and is formed from a carton blank 31, FIGURE 3, which is formed of any suitable paper products, such as corrugated board or the like.

Carton blank 31 may be substantially rectangular as shown and is longitudinally scored at 32, 33, 34, 35 and is transversely scored at 36, 37. The scores 32, 35, 36, 37 comprise double scores for a purpose hereinafter described.

Carton blank 31, being thus suitably cut and scored, defines an outside bottom wall or panel 38 being foldably connected at the side edges thereof to the bottom edges of a pair of side walls 39 and 40.

A pair of outside end walls or panel means 41 and 42 are respectively foldably connected at the inner side edge thereof to opposed end edges of side panel 39. Similarly, a pair of inside end walls or panel means 43 and 44 are respectively foldably connected at the inner side edges thereof to opposed end edges of the other side wall or panel 40.

A pair of inside bottom walls or panels 45 and 46 are respectively foldably connected to bottom edges of adjacent outside and inside panels 41, 43, and 42, 44, and to opposed end edges of outside bottom panel 38. Each inside bottom panel 45 or 46 is divided into three substantially triangular sections 47, 48 and 49.

Each section 47 of the inside bottom panels 45 and 46 is foldably connected to its respective associated section 48 by a double score 50 for a purpose later to be described and is separated from its associated section 49 by a diagonal die cut 51. Each section 48 is foldably connected to its associated section 49 by a slit score 52, the slit core 52 interrupting the inside surface and passing through a desired thickness of blank 31 to leave sufficient material at the outside surface of blank 31 to form hinge means.

A series of foldably connected edge flaps 53, 54 and 55 are respectively foldably connected to the top edges of the series of panels 41, 39 and 42 at the double score 32. Similarly, a series of foldably connected edge flaps 56, 57 and 58 are foldably connected to the top edges of the series of panels 43, 40 and 44 at double score 35.

The edge flaps 53 and 55 are respectively cut away at 59 to receive interlocking flaps 60 respectively carved out of edge flaps 56 and 58 in a manner more fully explained hereinafter.

The outer edge of bottom panels 45 and 46 and their associated inside end panels 43 and 44 are angularly cut away at 61 to permit blank 31 to be folded into the carton 30 as will be evident hereinafter. However, blank 31 need not be cut away at 61, and if desired, may have straight edges similar to the other blanks hereinafter described.

Figure 4:
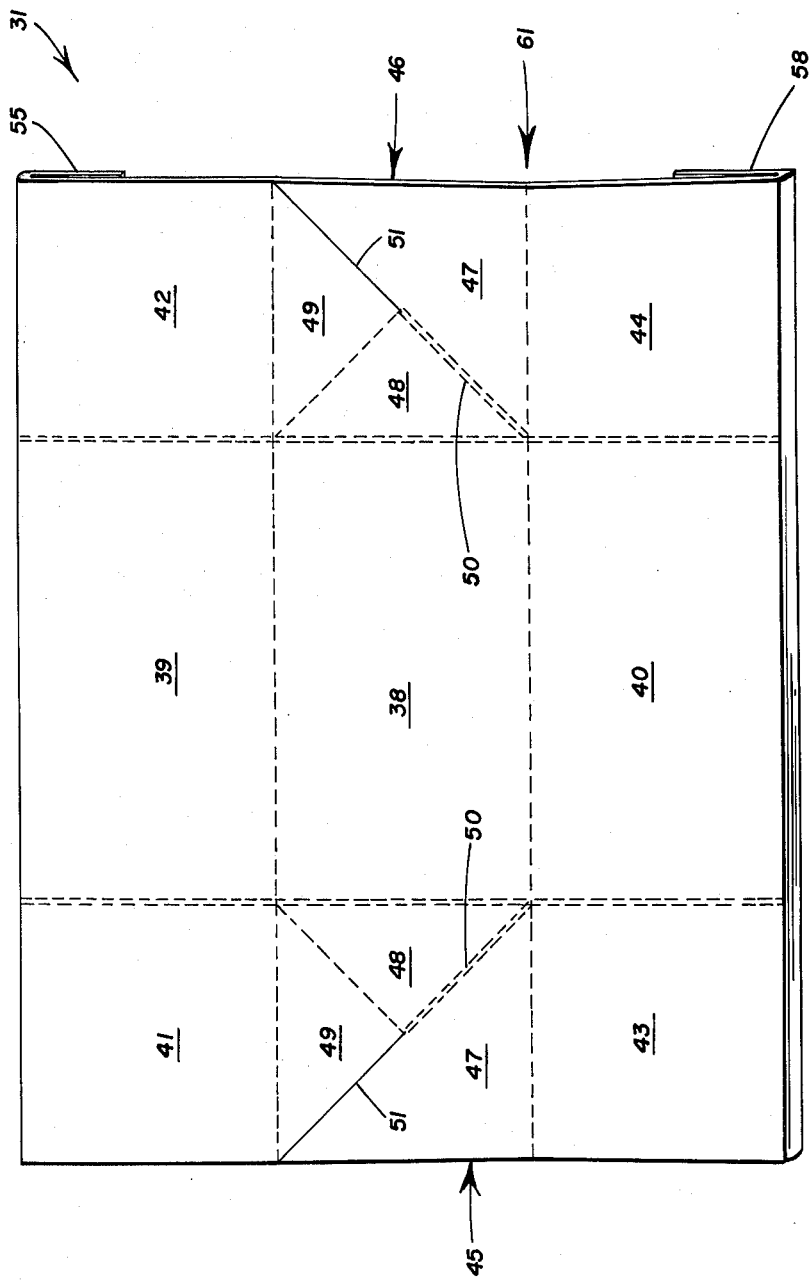
FIGURE 4 is a view similar to FIGURE 3 illustrating a carton blank in one of its folded positions.

After blank 31 has been cut and scored in the above manner, each series of edge flaps 53, 54, 55 and 56, 57, 58 are respectively folded against the outer surfaces of the respective series of panels 41, 39, 42 and 43, 40, 44 in the manner illustrated in FIGURE 4. The edge flaps are adapted to be so folded because of the respective double scores 32 and 35. However, it is to be understood that a single score could be provided to accomplish this feature and provide ease of function.

Subsequently, each series of panels 41, 45, 43 and 42, 46, 44 are folded against the inside surfaces of the adjacent half of the series of panels 39, 38 and 40 in the manner illustrated in FIGURE 5. The ease of folding panels in this manner is accomplished by double scores 36 and 37.

The sections 48 of the respective inside bottom panels 45 and 46 are secured to outside bottom panel 38 by any suitable means and, in the embodiment illustrated in the drawing, sections 48 of inside bottom panels 45 and 46 are respectively stapled to outside bottom panel 38 by staples 62.

After the sections 48 have been stapled, the fabrication of carton 30 from blank 31 is completed. The configuration of carton 30 illustrated in FIGURE 5 depicts carton 30 in its collapsed condition or position whereby carton 30 can be subsequently stored or shipped.

When it is desired to erect the carton 30 from its collapsed condition illustrated in FIGURE 5, outside end panels 41, 42 are grasped at the top edges thereof and are pulled outwardly relative to each other whereby the triangular sections 49 of the respective inside bottom panels 45 and 46 can be folded upon the sections 48 thereof in the manner illustrated in FIGURE 6. Thus, outside end panels 41 and 42 and the side panel 39 are erected at substantially right angles relative to outside bottom panel 38. The ease of folding sections 49 upon their associated sections 48 is accomplished by slit scores 52.

Subsequently, inside end panels 43 and 44 are grasped at the top edges thereof and moved outwardly away from each other whereby triangular sections 47 of the inside bottom panels 45 and 46 are respectively folded upon their associated sections 49 in a stacked relation to bring inside end panels 43 and 44 and side panel 40 at right angles relative to outside bottom panel 38.

As illustrated in FIGURE 7, when panels 43, 40 and 44 are being erected, edge flaps 56 and 58 are pulled slightly outwardly relative to their respective end panels 43 and 44 to receive edge panels 53 and 55 and top portions of their associated outside end panels 41 and 42 therebetween to interlock the same.

Figure 2:
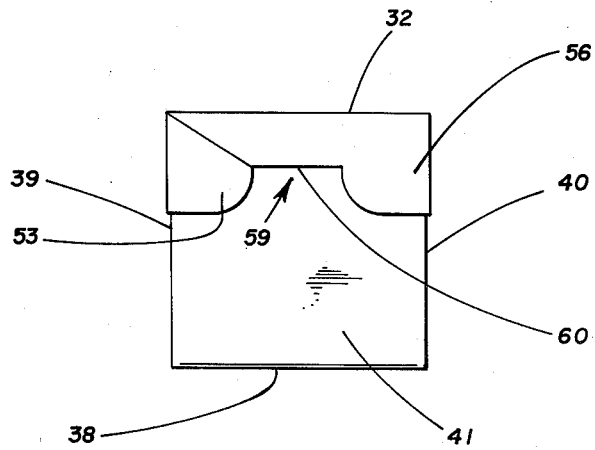
FIGURE 2 is an end view of the carton illustrated in FIGURE 1.

When panels 43, 40 and 44 are brought at right angles to outside bottom panel 38, the carton assumes the position illustrated in FIGURE 1 whereby double end walls are provided to add vertical structural strength to the carton. The superimposed end walls 41, 43 and 42, 44 are suitably detachably secured together to hold carton 30 in its erect position, and, in the embodiment illustrated in FIGURES 1–7, the superimposed end panels 41, 43 and 42, 44 are interlocked by tucking the locking flaps 60 into the respective cut out portions 59 of edge flaps 53, 55 between flaps 53 and 55 and the respective outside end panels 41 and 42 in the manner illustrated in FIGURE 2. Thus, by merely pulling out flaps 60 from under the edge flaps 53 and 55, the carton 30 can be quickly collapsed to the position illustrated in FIGURE 5 with a minimum of time and effort.

However, it is to be understood that under some applications of the carton 30, the mere friction between the outside end panels 41 and 42 and respective engaging portions of the inside end panels 43 and 44 and between edge flaps 53, 55 and 56, 58 is sufficient to hold carton 30 in its erected position without the use of additional fastening means, such as interlocking flaps 60.

Thus, it can be seen that there has been described an improved carton 30 which can be readily and quickly erected from its flat, collapsed condition, FIGURE 5, to its erect position, FIGURE 1, with a minimum of time and effort and without the use of any special tools or machinery at any desired location. Further, the carton 30 can be quickly collapsed from its erect position illustrated in FIGURE 1 to its collapsed position, FIGURE 5, with minimum time and effort.

It is to be understood that the blank 31 may be changed in various ways, such as to provide a cover for the carton 30, if desired.

Figure 9:
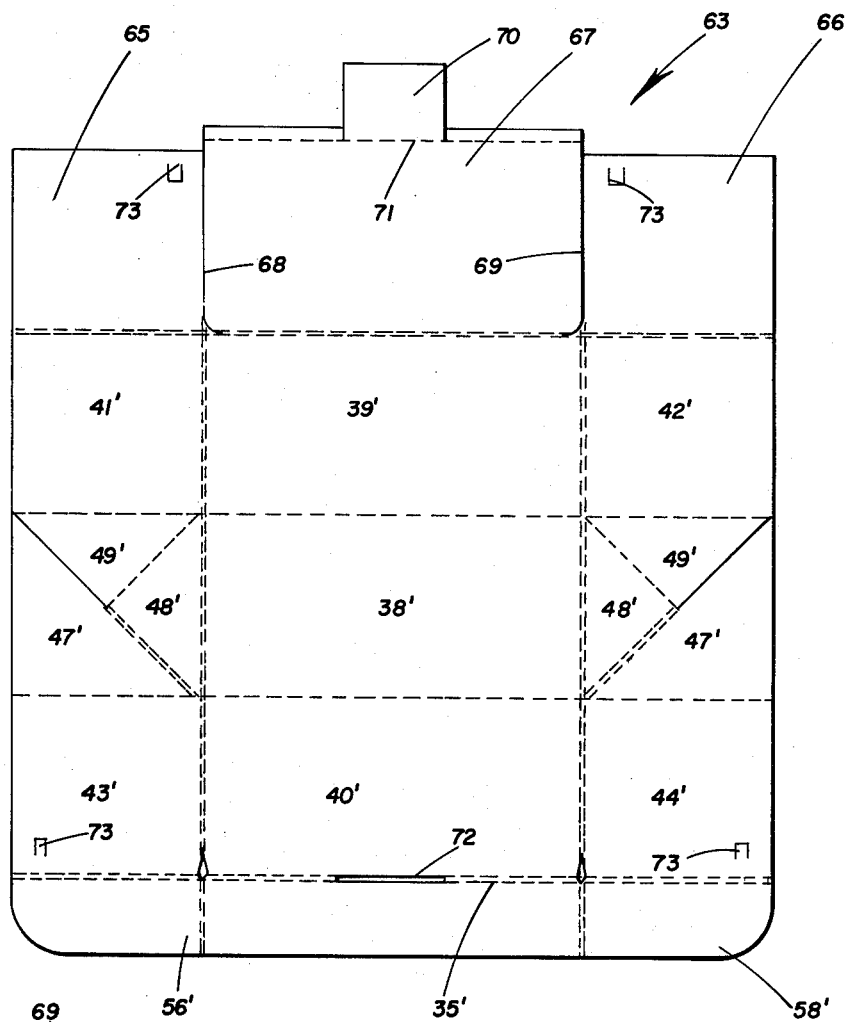
FIGURE 9 is a plan view of another improved carton blank of this invention, the carton blank being utilized to form the carton illustrated in FIGURE 8.
Figure 8:
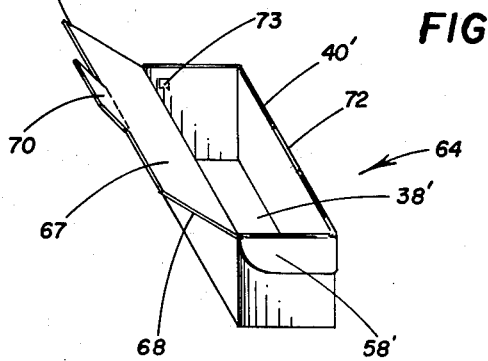
FIGURE 8 is a perspective view of another collapsible carton formed in accordance with the teachings of this invention and illustrates the same in its article receiving position.

In particular, blank 63, illustrated in FIGURE 9, is adapted to form a closeable carton 64 as illustrated in FIGURE 8.

Carton blank 63 is suitably cut and scored in substantially the same manner as blank 31 previously described and like scores, die cuts and panels thereof are designated by the same reference numerals followed by a prime mark. However, instead of edge flaps 56 and 58 of carton blank 63 being cut to define interlocking flaps 60, FIGURE 3, the same are left uncut in the manner illustrated in FIGURE 9.

Further, carton blank 63 is not provided with edge flaps 53, 54 and 55 as in carton blank 31. In place thereof, a pair of reinforcing end flaps 65 and 66 are respectively foldable connected to the top edges of the outside end panels 41' and 42' at the double score 32'.

A closure panel 67 is foldably connected to the top edge of side panel 39' at the double score 32' and is separated from reinforcing flaps 65 and 66 by die cuts 68 and 69. A tongue 70 is partially carved out of the cover 67 and is foldably connected thereto at score line 71, the tongue 70 being adapted to register with a slot 72 formed between double score 35' for a purpose explained hereinafter.

Three sides of interlocking flaps 73 are die cut in the reinforcing end panels 65 and 66 and in the inside end panels 43' and 44' in the manner illustrated in FIGURE 9. The flaps 73 in the respective pairs of panels 65, 43' and 66, 44' are adapted to register with each other when carton blank 63 has been folded to form the carton 64 in substantially the same manner as carton 30 previously described. These registering flaps 73 are then adapted to be pressed outwardly to detachably interlock the superimposed end walls 65, 41', 43' and 66', 42', 44' together when carton is erected as illustrated in FIGURE 8.

To close carton 64, the closure flap 67 is brought downwardly against the open end thereof and tongue 70 is disposed in slot 72 to detachably close the carton 64.

Other types of closure means may be provided, if desired. For example, carton 74, FIGURE 10, may be formed from blank 75 of this invention, the carton having four conventional appearing closure flaps 76, 77, 78 and 79.

The blank 75 is similar to blank 31 previously described and like panels, die cuts and scores are indicated with like reference numerals followed by the reference letter a. The closure flaps 76, 77 and 78 are respectively foldably connected to panels 41a, 39a and 42a at the score 32a, the flaps 76, 77 and 78 being respectively separated from each other by die cuts 80 and 81. Similarly, flaps 82, 79, 83 are respectively foldably connected to panels 43a, 40a, 44a and are separated from each other by die cuts 84 and 85.

Interlocking flaps 73a are respectively carved out of panels 41a, 42a, 43a, and 44a in a manner similar to interlocking flaps 73 formed in blank 63, FIGURE 9. In addition, interlocking flaps 86 are carved out of flaps 82 and 83, the interlocking flaps 86 respectively registering with flaps 73a formed in panels 43a and 44a when flaps 82 and 83 are respectively folded upon the panels 43a and 44a and suitably secured thereto in the manner illustrated in FIGURE 10.

Thus, when carton 74 is erected from its collapsed preassembled position in the manner previously described, the superimposed end panels 43a, 41a and 44a, 42a may be interlocked together by pushing outwardly on the aligned flaps 86, 73a. After carton 74 has been erected, the same may be closed by the closure flaps 76—79 in the conventional manner.

Another carton of this invention is illustrated in FIG-

Figure 13:
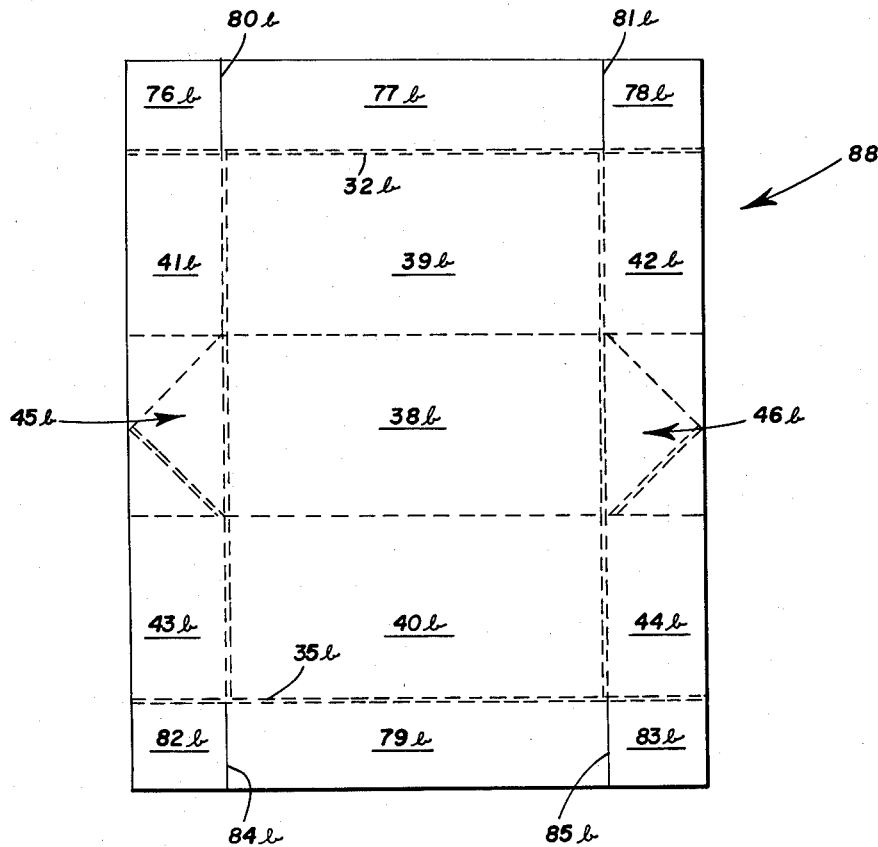
FIGURE 13 is a plan view of the carton blank for the carton of FIGURE 12.

URE 12 and is generally indicated by reference numeral 87. The carton 87 is formed from a blank 88, FIGURE 13.

Blank 88 is suitable cut and scored in the same manner as blank 75 previously described and like panels, die cuts and scores are indicated by like reference numerals followed by reference letter b.

Panels 41b, 42b, 45b, 46b, 43b, 44b and flaps 76b, 78b, 82b, 83b each have a width substantially equal to one-half of the width of the outside bottom panel 38b.

Figure 12:
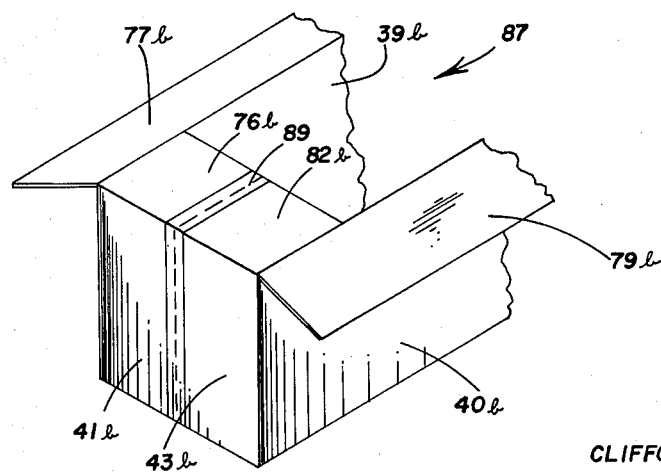
FIGURE 12 is a perspective view of still another carton of this invention.
Figure 15:
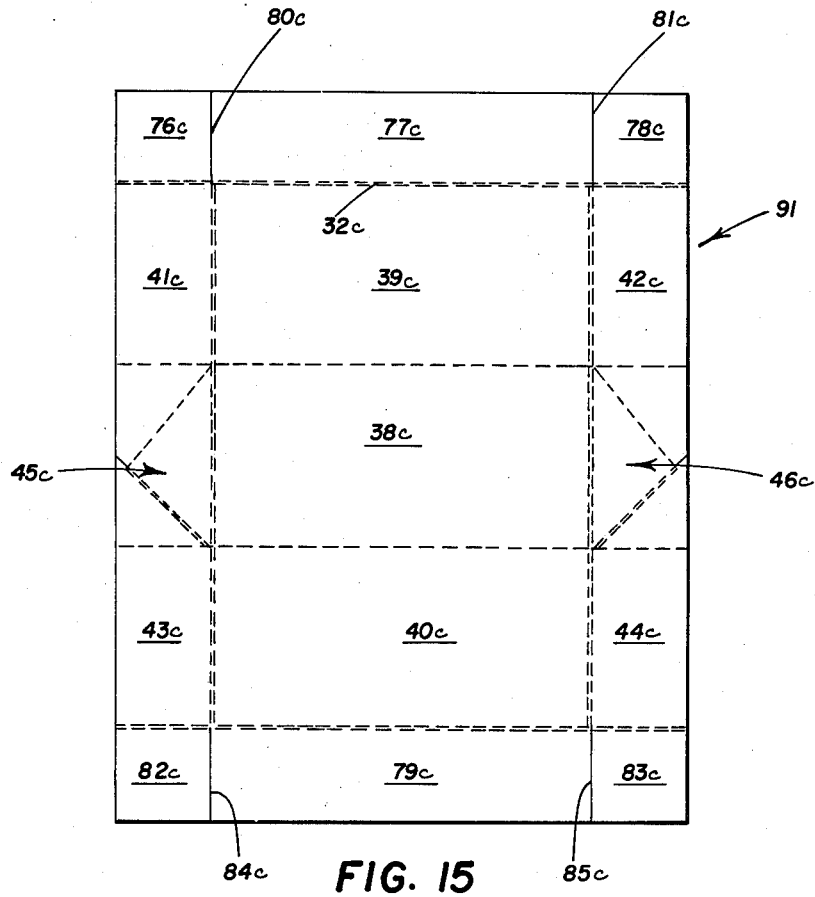
FIGURE 15 is a plan view of the carton blank for the carton of FIGURE 14.

In this manner, when the blank has been pre-assembled to its collapsed position and subsequently erected in the manner previously described, adjacent pairs of end panels 41b, 43b and 42b, 44b and their associated pairs of closure flaps 76b, 82b and 78b, 83b abut each other in the manner illustrated in FIGURE 12 whereby the same may be suitably secured together in aligned relation, and in the embodiment illustrated in the drawings, a tape 89 having adhesive on its inner surface is utilized to secure adjacent panels and flaps together.

Each pair of closure flaps 76b, 82b and 78b, 83b thus forms a closure flap similar to closure flaps 76 and 78 of carton 74, FIGURE 11.

Figure 14:
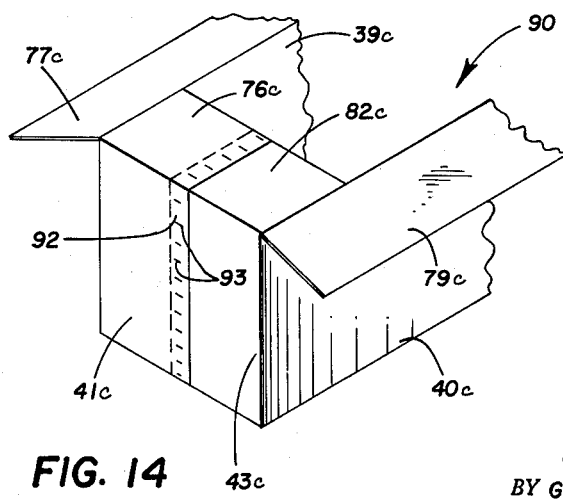
FIGURE 14 is a perspective view of another embodiment of this invention.

Another carton, similar to carton 87, is illustrated in FIGURE 14 and is generally indicated by reference numeral 90. Carton 90 is formed from a blank 91 which is suitably cut and scored in a manner similar to blank 88 previously described and like panels, die cuts and scores are indicated by like reference numerals following by reference letter c.

Panels 41c, 42c, 45c, 46c, 43c, 44c and closure flaps 76c, 78c, 82c, 83c each have a width slightly greater than the width of outside bottom panel 38c. In this manner, after blank 91 has been pre-assembled to its flat collapsed position and is subsequently moved to its erect position in the manner previously described, the adjacent pairs of end panels 41c, 43c and 42c, 44c and their associated pairs of closure flaps 76c, 82c and 78c, 83c have their inner ends disposed in overlapping relation as illustrated at 92 in FIGURE 14. The inner ends of panels 43c and 44c and their associated closure flaps 82c and 83c are disposed inside the inner ends of the respective end panels 41c and 42c and their associated closure flaps 76c and 78c because of the bellows construction of the inside bottom panels 45c and 46c.

The overlapping ends of the pairs of end panels 41c, 43c and 42c, 44c and their associated pairs of closure flaps 76c, 82c and 78c, 83c may be secured together in any suitable manner, and in the embodiment illustrated in the drawings, they are secured together by staples 93.

Figure 16:
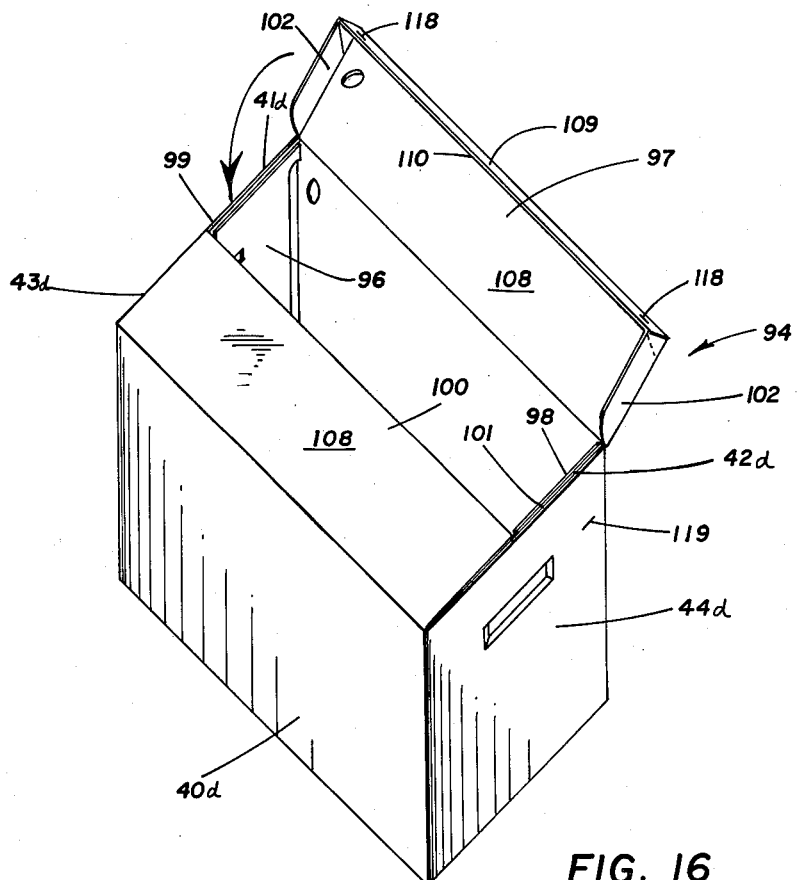
FIGURE 16 is a perspective view of still another embodiment of this invention.

Another carton, formed according to the teachings of this invention, is illustrated in FIGURE 16 and is generally indicated by reference numeral 94 being a carton which is particularly adapted for carrying twenty-four, twelve ounce bottles but not being limited only to that use.

Figure 3:
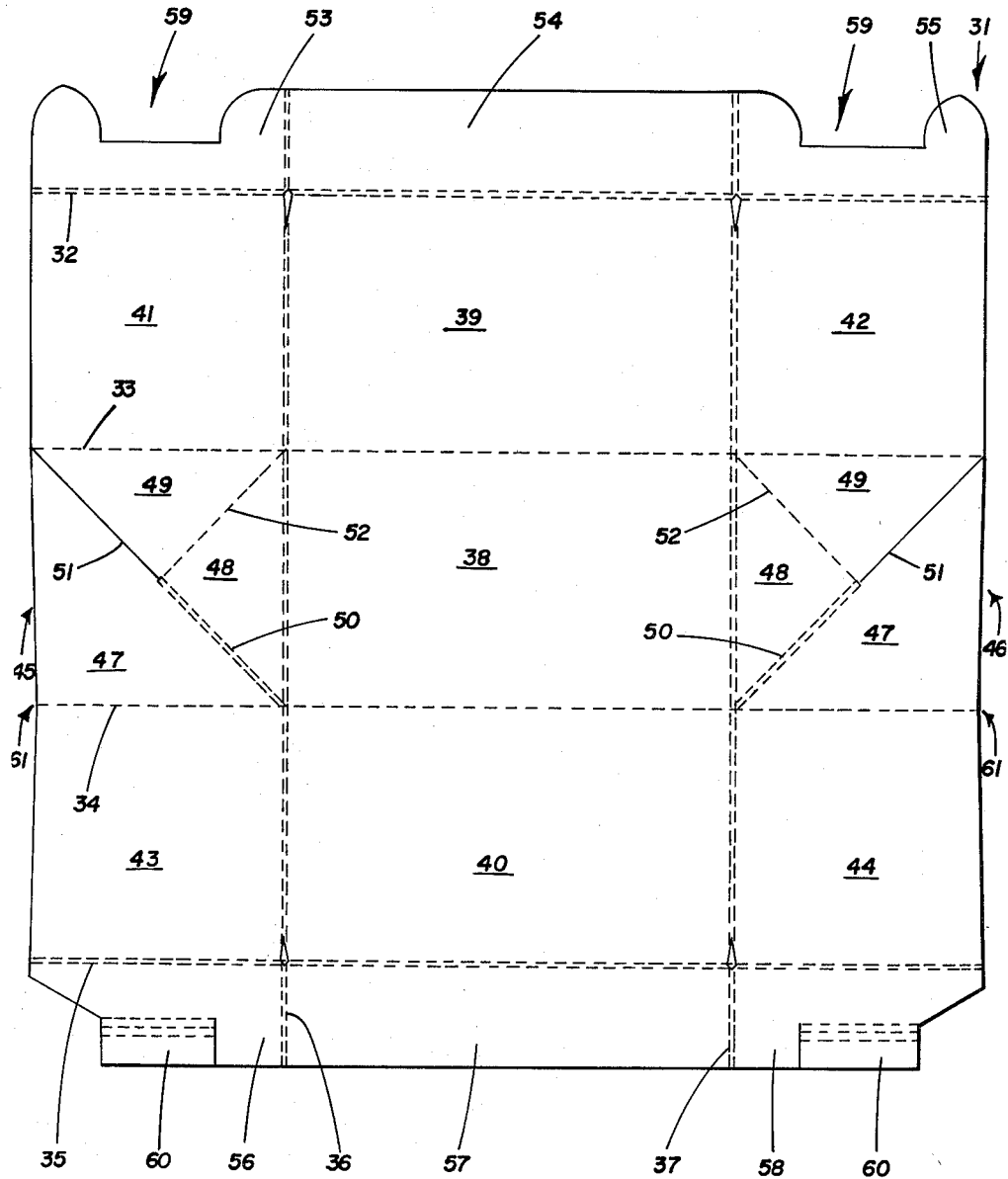
FIGURE 3 is a plan view of a carton blank of this invention from which the carton of FIGURE 1 is assembled.
Figure 17:
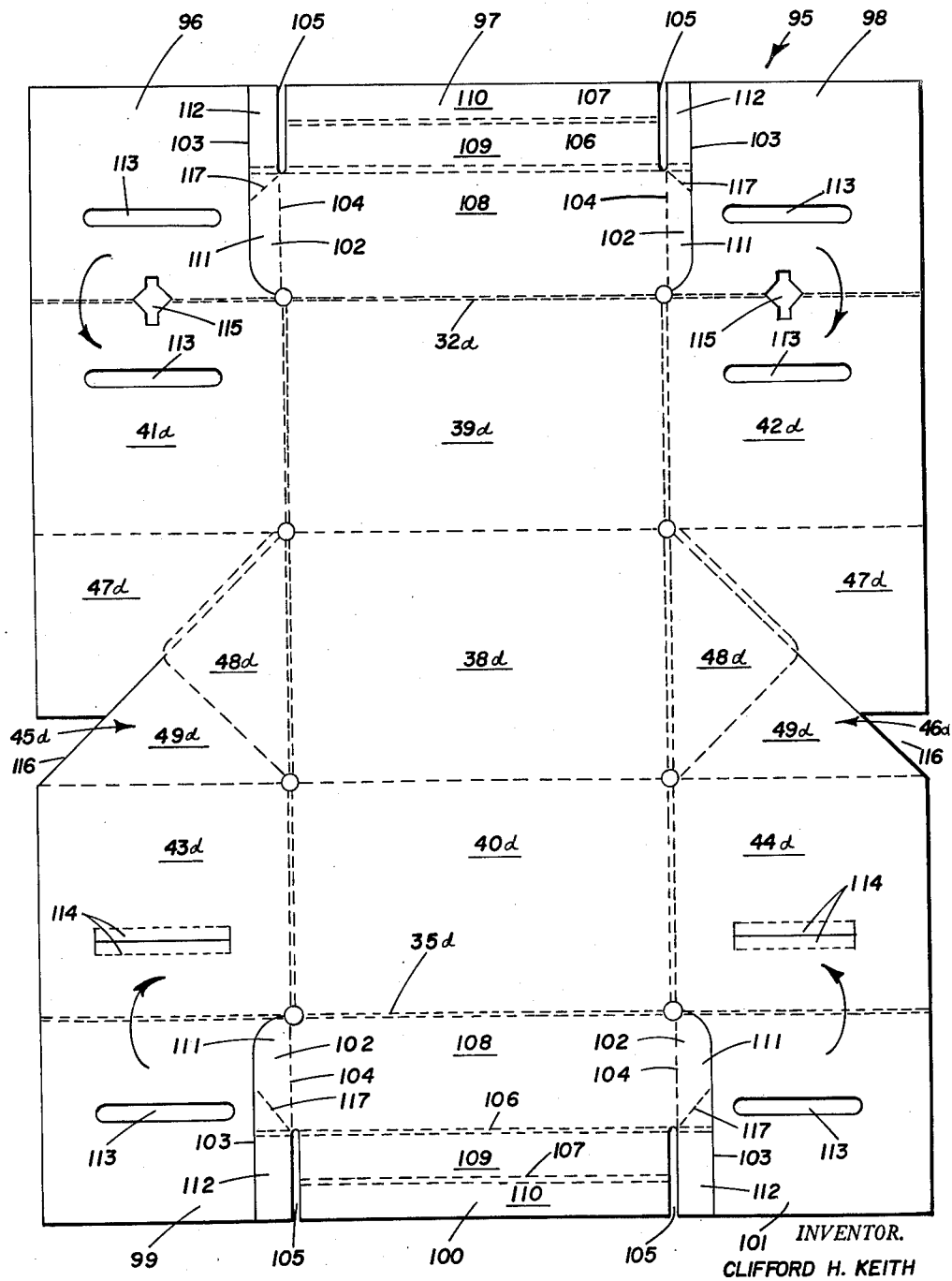
FIGURE 17 is a plan view of the blank for the carton of FIGURE 16.

Carton 94 is formed from a blank 95, FIGURE 17, which is cut and scored in a manner similar to blank 31 of FIGURE 3 and like panels, die cuts and scores are indicated with like reference numerals followed by reference letter d.

A series of flaps 96, 97 and 98 are respectively foldably connected to the outer edge of panels 41d, 39d, 42d and a similar series of flaps 99, 100, 101 are foldably connected to panels 43d, 40d and 44d.

Each flap 97 and 100 includes a pair of edges flaps 102 respectively carved out of adjacent flaps 96, 98 and 99, 101 at 103 and having a portion thereof foldably connected to flaps 97 or 100 at score 104. The remaining portion of each edge flap 102 is separated from its respective flap 97 or 100 by a die cut 105.

Each flap 97 and 100 is longitudinally scored at 106 and 107 to divide the flap into three sections 108, 109, 110, the score 106 being extended to include the adjacent pair of edge flaps 102 and divide the same into two sections 111 and 112.

Panels 41d and 42d and flaps 96, 98, 99, 101 are respectively provided with slots 113. The panels 43d and 44d have a pair of opposed flaps 114 die cut therein. The slots 113 in flaps 99 and 101 are adapted to be registered with flaps 114 when flaps 99 and 101 are respectively superimposed on panels 43d and 44d. Similarly, slots 113 in flaps 96 and 98 are adapted to be registered with slots 113 in the panels 41d and 42d when superimposed thereon.

The adjacent edge portions of each pair of panels 41d and 42d and their associated flaps 96 and 98 are cut away at 115 for a purpose hereinafter set forth.

Since, in the embodiment illustrated in the drawings, the width of each of the panels 45d and 46d is slightly greater than one-half of the width of outside bottom panel 38d, each triangular section 47d of panels 45d and 46d is cut away at 116 whereby the triangular sections 47d abut each other when carton 94 is erected in the manner hereinafter described.

Each section 111 of the edge flaps 102 is diagonally scored at 117 to permit folding thereof.

Figure 18:
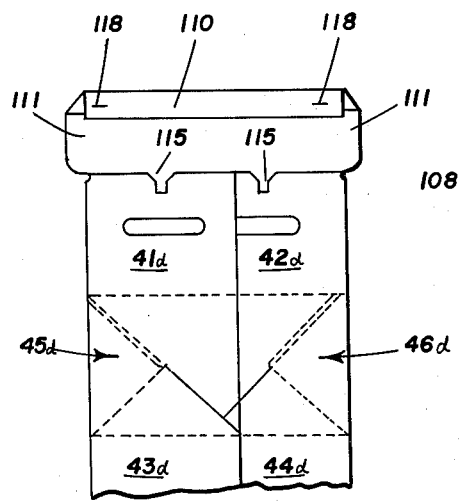
FIGURE 18 is a fragmentary view of the carton of FIGURE 17 illustrating the same in its collapsed position.

After the blank has been cut and scored in the above manner, the flaps 96, 98, 99, 101 are respectively folded over panels 41d, 42d, 43d, 44d and secured thereto in any suitable manner, such as by gluing or the like. Thereafter, the series of panels 42d, 46d and 44d is folded over the series of panels 39d, 38d and 40d and the triangular section 48d of panel 46d is secured to panel 38d in any suitable manner, and in the embodiment illustrated in the drawings, section 48d is secured by gluing. Similarly, the series of panels 41d, 45d and 43d is folded over the series of panels 39d, 38d and 40d and the section 48d of panel 45d is secured to the outside bottom panel 38d. As illustrated in FIGURE 18 the series of panels 41d, 45d and 43d overlaps the series of panels 42d, 46d and 44d.

Either prior to the above folding operation or after the same, the sections 112 of edge flaps 102 are respectively folded between the respective sections 109 and 110 of flaps 97 and 100 as sections 109 and 110 are folded at right angles to sections 108 and the sections 110 are folded upon sections 109. The sections 112, 109 and 110 are secured in this folded relation in any suitable manner, such as by staples 118, FIGURE 18.

When it is desired to ship or store the thus pre-assembled carton 94 in its flat collapsed position, the sections 109 and 110 of each flap 97 and 100 is bent flat thereagainst whereby the edge flaps 102 are bent into coplanar relation with the rest of the carton, FIGURE 18, by being folded along the scores 117.

The collapsed carton is erected to its article receiving position in the same manner as the other cartons previously described whereby the end panels 41d and 42d are respectively disposed inside of panels 43d and 44d. Each pair of superimposed panels 41d, 43d and 42d, 44d are suitably secured together by any desired means, such as by staples 119, FIGURE 16.

To close carton 94, the closure flaps 97 and 100 are bent downwardly toward the carton 94 whereby sections 111 of edge flaps 102 are respectively received between flaps 99 and 101 and panels 41d and 42d while the sections 109 and 110 of each closure flap 97 and 100 are received in the cut-away portion 115 of panels 41d and 42d and flaps 96 and 98.

The handle flaps 114 in panels 43d and 44d are then pushed inwardly into the aligned slots 113 whereby flaps 114 prevent moisture from entering the corrugations of the panels at the slots 113 thereof.

Therefore, it can be seen that various carton structures have been provided whereby cartons can be shipped or stored in a flat, collapsed condition and be readily erected with a minimum of time and effort.

While the foregoing presents preferred embodiments of the present invention, it is obvious that other modifications and/or equivalents may be employed without departing from the scope of the invention, which is defined in the appended claims.

What is claimed is:

1. A carton comprising an outside bottom panel having opposed side edges and opposed end edges, a pair of side panels respectively having opposed top and bottom edges and opposed end edges and being respectively foldably connected at the bottom edges thereof to said side edges of said outside bottom panel, a first pair of end panel means respectively having opposed top and bottom edges and opposed side edges and being respectively foldably connected at one side edge thereof to said opposed end edges of one of said side panels, a second pair of end panel means respectively having opposed top and bottom edges and opposed side edges and being respectively foldably connected at one side edge thereof to said opposed end edges of the other side panel, and a pair of inside bottom panels each being foldably connected to said bottom edges of adjacent end panel means and to an adjacent end edge of said outside bottom panel, each of said end panels having a downturned edge reinforcing marginal portion, one of said marginal portions of each pair of end panels having a centrally disposed notch in its lower edge and the other marginal portion of each pair having a tongue bendable through the notch and up into the channel between the first marginal portion and its attached panel to connect said panels together by the resulting nesting interengagement of their double thickness margins.

2. A carton as set forth in claim 1 wherein each of said inside bottom panels is folded into three substantially triangular sections.

3. A carton as set forth in claim 1 wherein each of said inside bottom panels is folded into three substantially triangular sections and said sections are disposed in stacked relation.

4. A carton as set forth in claim 1 wherein each of said inside bottom panels is folded into three substantially triangular sections and one of said sections is fastened to said outside bottom panel.

5. A collapsible carton comprising an outside bottom panel, a pair of opposed side panels respectively foldably connected to said outside bottom panel, a pair of inside end panels respectively foldably connected to one of said side panels, a pair of outside end panels respectively foldably connected to the other side panel, and a pair of inside bottom panels each being foldably connected to adjacent inside and outside end panels and to said outside bottom panel, each inside bottom panel being foldable into three three substantially triangular sections whereby each series of inside end panel, inside bottom panel, and outside end panel is superimposed on an adjacent half of said series of side panels and outside bottom panel when said carton is collapsed and said sections of said inside bottom panels are respectively disposed in stacked relation when said carton is erect to bring said end panels and side panels at substantially right angles relative to said outside bottom panel, each of said end panels having a downturned edge reinforcing marginal portion, one of said marginal portions of each pair of end panels having a centrally disposed notch in its lower edge and the other marginal portion of each pair having a tongue bendable through the notch and up into the channel between the first marginal portion and its attached panel to connect said panels together by the resulting nesting interengagement of their double thickness margins.

6. A collapsible carton according to claim 5 wherein said downturned edge reinforcing marginal portions are interconnected by integral extensions thereof forming similar reinforcing margins along the upper edges of the side panels attached to said end panels, whereby said interconnected marginal portions hold each other in panel hugging positions.

References Cited in the file of this patent

UNITED STATES PATENTS

| | | |
|---|---|---|
| 536,065 | Birley | Mar. 19, 1895 |
| 912,263 | Potter | Feb. 9, 1909 |
| 1,021,874 | Labombarde | Apr. 2, 1912 |
| 1,738,744 | Walter | Dec. 10, 1929 |
| 1,988,698 | Newhouse | Jan. 22, 1935 |
| 2,630,263 | Ringler | Mar. 3, 1953 |
| 2,652,968 | Bolding | Sept. 22, 1953 |
| 2,659,524 | McElwee | Nov. 17, 1953 |
| 2,880,922 | Levkoff | Apr. 7, 1959 |